United States Patent [19]
Kinney

[11] 3,940,014
[45] Feb. 24, 1976

[54] FEEDING METHOD AND APPARATUS FOR CONTAINERS

[75] Inventor: Alfred W. Kinney, Kansas City, Mo.

[73] Assignee: Phillips Petroleum Company, Bartlesville, Okla.

[22] Filed: Apr. 29, 1974

[21] Appl. No.: 464,954

[52] U.S. Cl. ............... 221/10; 221/12; 221/222; 221/297; 221/172
[51] Int. Cl.² .......................................... G07F 11/00
[58] Field of Search ......... 221/10, 11, 12, 221, 222, 221/223, 297, 172; 198/33 AA

[56] References Cited
UNITED STATES PATENTS

| | | | |
|---|---|---|---|
| 2,946,481 | 7/1960 | Carew | 221/222 |
| 3,225,960 | 12/1965 | Whelan | 221/10 |
| 3,367,534 | 2/1968 | Carter | 221/10 X |
| 3,776,346 | 12/1973 | Dubuit | 221/10 |

*Primary Examiner*—Allen N. Knowles

[57] ABSTRACT

The flow of containers along a first conveyor providing a supply of unfilled containers to a filling machine is interrupted, with containers from the first conveyor being transferred to a second conveyor which, in turn, supplies containers to a filling machine. Each time a container is delivered from the secondary conveyor into the filling machine an additional container is transferred from the first conveyor to the secondary conveyor. Timing of containers entering the secondary conveyor is controlled to avoid interference with dispensing apparatus placing containers into the filling machine.

18 Claims, 8 Drawing Figures

FEEDING METHOD AND APPARATUS FOR CONTAINERS

This invention relates to a method and apparatus for feeding containers. In one aspect it relates to a method and apparatus for feeding non-nestable containers.

Automated filling of a container with a product is ordinarily most efficiently accomplished by operating at the maximum reliable filling rate permitted by the nature of the product being placed into the containers, the design of the filling equipment, the capacity of the equipment carrying products and containers to or removing filled containers from the filling machine, and other similar limiting factors. In the packaging of many products, particularly those which are not detrimentally affected and may even be benefited by the most rapid possible handling, the ability of the filling machine and associated apparatus to accurately perform the necessary container handling steps is often the factor which limits the filling rate. Most liquid or semiplastic materials, for example, are not damaged in any way by the most rapid possible container-filling techniques. Refrigerated products in particular are desirably packaged in the least possible amount of time in order to insure a minimum of product degradation due to possible temperature changes during the packaging process. In addition, the bulk production of many products, such as ice cream, is often accomplished utilizing equipment which requires the continuing removal of product to a packaging machine in order to prevent damage to the production equipment. It is therefore desirable to provide packaging equipment which is not only fast but also reliable in order to avoid waste during the packaging process. It is therefore necessary to provide a method and apparatus for feeding unfilled containers to a filling machine which will act reliably and rapidly. The necessity for such a reliable and accurate feeding apparatus is especially important in the handling of non-nestable containers.

Accordingly, an object of this invention is to provide a method and apparatus for feeding containers. A further object is to provide a method and apparatus for feeding non-nestable containers. An additional object of the invention is to provide a method and apparatus which minimizes interference by the container feeding process with a container dispensing mechanism.

In accordance with the invention a method and apparatus are provided whereby a supply of oriented containers is provided by a first conveyor means to a transfer station. Container release means located at the transfer station permits a container to pass the transfer station in response to a container advance signal. The container thus released by the container release means is accepted by a second conveyor which, in turn, delivers the container to a container dispensing station associated with a container filling machine. At the container dispensing station a container dispensing means positions each container in relationship with a conveyor means of the filling machine. A signal generating means associated with the container dispensing means delivers the container advance signal to the container release means in timed relationship with the operation of the container dispensing means. By releasing only one container from the first conveyor means each time a container is delivered to the filling machine by the container dispensing means, a predetermined backlog of containers is maintained in the second conveyor means. Vertical stacking of the backlog of containers within the second conveyor means above the container dispensing means is utilized to exert a force substantially equal to the weight of the backlogged containers on each container dispensed by the dispensing mechanism in order to insure positive displacement of the dispensed container into the conveyor of the filling machine. By timing the release of additional containers from the first conveyor means in synchronization with the release of a container from the dispensing means, the impact of each successive container entering the second conveyor means onto the backlog of containers already within the second conveyor means is timed to avoid interference with the efficient and reliable operation of the container dispensing means.

Additional objects and advantages of the invention will be apparent from the following description of the drawing in which:

FIG. 5 is an exploded perspective view of a worm gear and worm gear lead-in;

Figure 1:
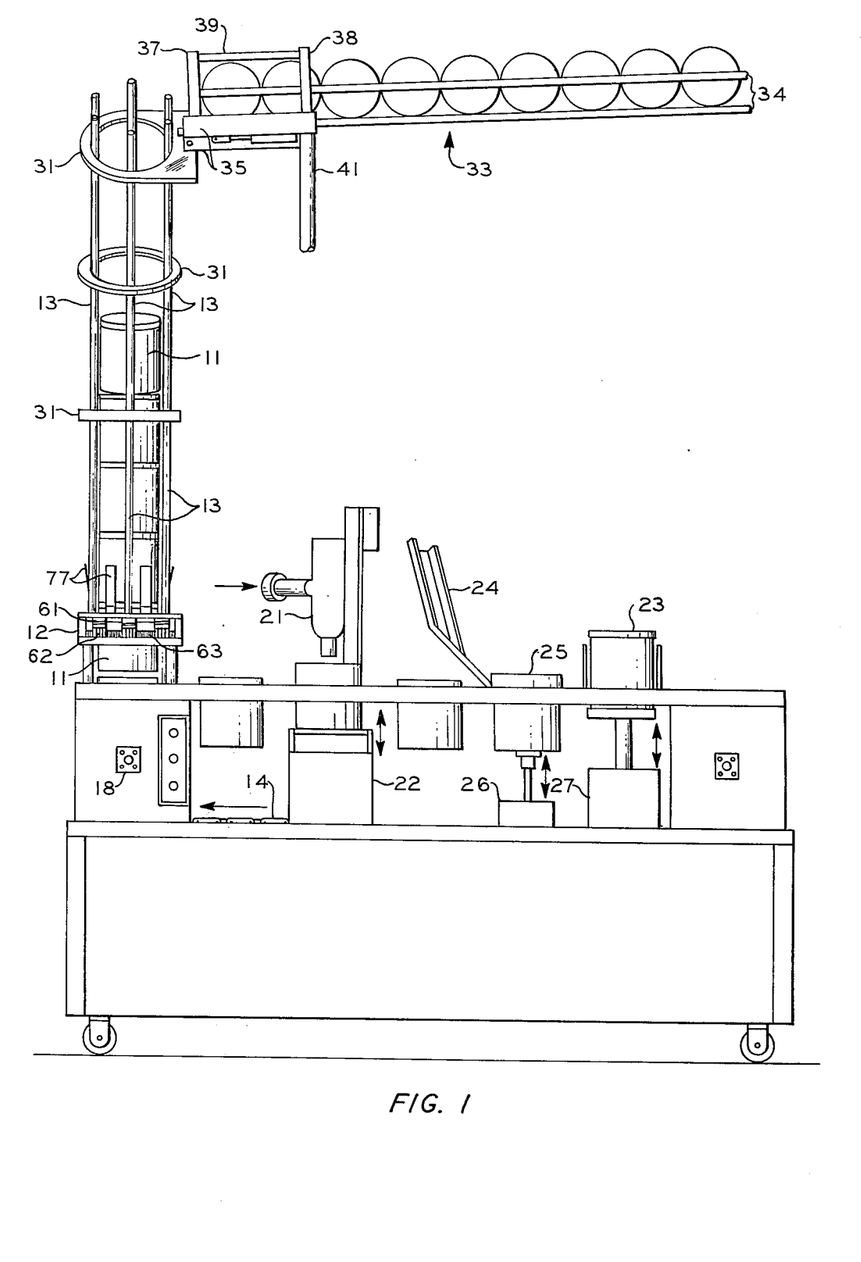
FIG. 1 is an elevational front view of a container feeding and filling apparatus.
Figure 2:
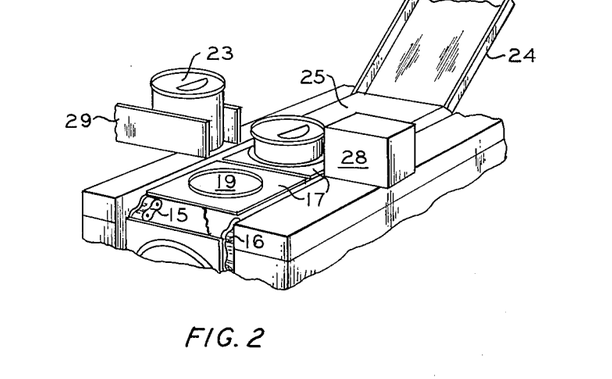
FIG. 2 is a partial perspective view of the apparatus of FIG. 1.

Referring now to FIG. 1, a container-filling machine and its associated unfilled container feeding mechanism are illustrated in which a stack of non-nestable, substantially cylindrical containers 11 is supported by container-dispensing mechanism 12 and six vertical guide rods 13 over an endless conveyor 14. Each container 11 has a generally circular horizontal cross section and is provided with an annular rolled rim 10 (See FIG. 6) projecting outwardly and downwardly from the upper end or mouth thereof. As shown in FIG. 2, conveyor 14 comprises two parallel endless chains 15 and 16 and a plurality of container-supporting members 17 carried by chains 15 and 16. Conveyor 14 is indexed in a stepwise manner by drive axle 18. During the dwell portion of each step or cycle, the dispensing mechanism 12 releases the lowermost container 11 from the stack and drops the released container into the opening 19 in the container-supporting member 17 which is positioned in the container-receiving station below the dispensing mechanism 12.

Filler valve 21 is actuated during the dwell portion of each cycle to introduce the material to be packaged into the container 11 positioned in the filling station of the conveyor. If desired, a container lift mechanism 22 can be employed to raise the container 11 to be filled so that the outlet end of filler valve 21 is inside the container and adjacent the bottom of the container before the filler valve 21 is actuated. Mechanism 22 can then gradually lower the container as it is being filled to provide uniform distribution of the product in the container.

Closures 23 are fed into chute 24, the lower end of which is positioned over conveyor 14, in such a manner that the leading edge of the lowermost closure is contacted by the leading edge of the rim of the container 11 as conveyor 14 indexes the container into the capping station. The forward motion of the container 11 draws the engaged enclosure 23 from chute 24, while the contact of the upper surface of the closure 23 with a horizontal plate 25 forces the closure 23 down onto the rim of the container 11. If desired, container marking mechanism 26 can be actuated during the dwell portion of each cycle to raise the container 11 and the associated closure 23 into firm contact with plate 25 to firmly position the closure 23 on the container 11 and to apply indicia to the bottom of the container.

During the dwell portion of each cycle, lift mechanism 27 is actuated to raise the filled and capped container which is in the discharge station of conveyor 14 to a position above conveyor 14 and then discharge mechanism 28 (FIG. 2) is actuated to move the elevated container laterally of conveyor 14 and onto an output chute 29.

FIG. 2 is a perspective view of the capping station and the discharge station of the filling machine as viewed from a position above, behind, and to the right of the filling machine of FIG. 1. FIG. 2 further illustrates the relationship among the chute 24 and horizontal plate 25 of the capping station, the discharge mechanism 28 and output chute 29 of the discharge station, and the two parallel endless chains 15 and 16 and the supporting members 17 of the conveyor 14.

The six guide rods 13 extending upwardly from the dispensing means 12 are maintained in the desired spatial relationship to each other by annular reinforcing rings 31. Together the guide rods 13 and reinforcing rings 31 form a gravity operated conveyor or chute which extends substantially vertically from the dispensing mechanism 12 to accommodate a desired number of containers 11 stacked above the dispensing mechanism 12. The top of the thus formed chute can curve toward a horizontal direction an amount sufficient to permit acceptance by the chute of horizontally disposed containers 11 being discharged from the transfer station of overhead conveyor means 33, but does not curve enough to impede the gravity flow of containers released into the top portion of the chute.

The overhead conveyor 33 comprises a plurality of guide rods 34 positioned to permit a supply of unfilled containers 11 to roll on their sides from a container supply source (not shown) to a container transfer station. The containers 11 are all positioned on the conveyor 33 with the open top end of each container toward the viewer of FIG. 1. The container transfer station comprises a main frame 35 supporting subframe members 37 and 38. The main frame and subframe members support the guide rods 34 of the conveyor 33 as well as such additional guide rods 39 as may be desired for use in conjunction with the particular container release mechanism employed at the transfer station. The main frame 35 of the conveyor 33 can be supported by means of a support stand 41, a portion of which is illustrated in FIG. 1, or the conveyor 33 can be suspended overhead or otherwise supported and maintained in its desired position. While the illustrated embodiment of the conveyor 33 is gravity operated, any suitable conveying means can be utilized to maintain a ready supply of containers 11 at the container transfer station. Any source of containers 11 which is able to provide an adequate supply of the containers to the transfer station of the conveyor 33 can be utilized in conjunction with the invention. In many cases the container supply source will be a container-forming machine which constructs each container 11 from paperboard, coated paperboard, thermoplastic, or other appropriate raw materials and deposits the finished container on the conveyor 33.

Figure 3:
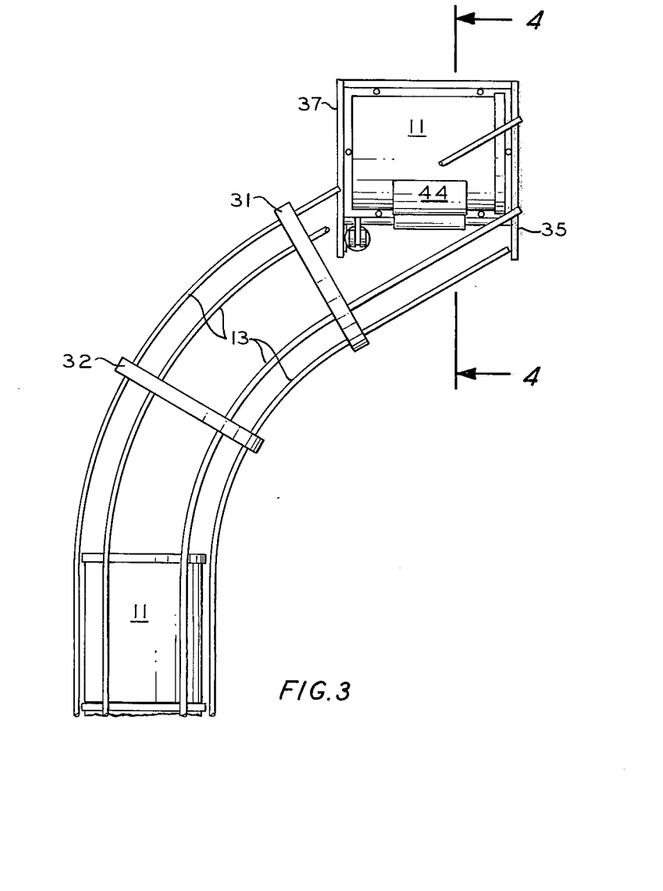
FIG. 3 is a partial side elevational view of the apparatus of FIG. 1.

FIG. 3 illustrates, in a side elevation view, the relationship between the chute formed by guide rods 13 and annular reinforcing rings 31 and the transfer station of the conveyor 33. A container 11 is maintained at the transfer station by an escapement mechanism 44. Although any similar mechanism can be used, the preferred escapement mechanism illustrated comprises an arcuate metal plate, substantially matching the curved outer surface of each container 11, and a mounting member attached to the plate and adapted to accept a shaft about which the entire escapement mechanism can rotationally move. When the escapement mechanism 44 is operated to release a container 11, the container is received by the guide rods 33 and is carried by gravity into a position above the dispensing mechanism 12.

Figure 4:
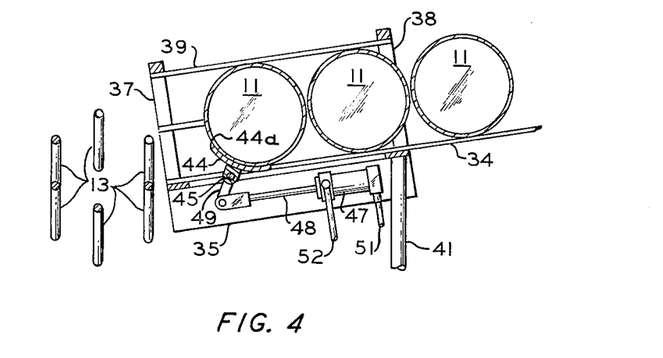
FIG. 4 is a sectional elevational view along plane 4—4 of FIG. 3.
Figure 4A:
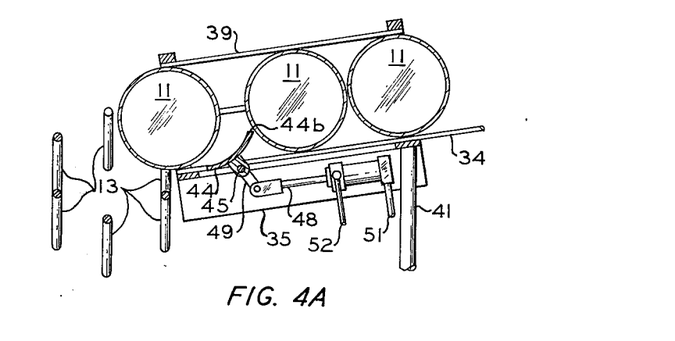
FIG. 4A illustrates a different position of the apparatus of FIG. 4.

FIG. 4 illustrates a cross sectional view of the transfer station of conveyor 33 as seen along the section designated by line 4—4 in FIG. 3. The escapement mechanism 44 is pivotally mounted on a shaft 45, the shaft 45 being supported at each end by the main frame 35. A double acting hydraulic or pneumatic cylinder 47 drives a piston rod 48 which is pivotally attached to a lever 49. The lever 49 is rigidly attached to the escapement mechanism 44 so that when the piston rod 48 is moved in a longitudinal direction, the lever 49 and escapement mechanism 44 rotate about the shaft 45. Application of hydraulic or pneumatic pressure through signal line 51 will cause the piston rod 48, lever 49, and escapement mechanism 44 to be placed in a first position as illustrated by FIG. 4. Application of a hydraulic or pneumatic signal through signal line 51 will cause the escapement mechanism to be placed in a second position as illustrated by FIG. 4A.

When the escapement 44 is in the first position, illustrated by FIG. 4, the first end 44a of the escapement 44 prevents any container 11 from exiting the transfer station. To insure that an unexpected disturbance or pressure will not cause a container 11 to jump over the first edge 44a of the escapement 44, the clearance between the first edge 44a of the escapement and one or more guide rods 39, supported by subframe members 37 and 38, is too small to permit the passage of a container 11. When the pressure in signal line 51 is released and pressure is applied to signal line 52, the escapement mechanism is moved to its second position illustrated by FIG. 4A. In the second position, the container 11 which had been retained at the transfer station by the first edge 44a of the escapement mechanism 44 is released and is permitted to enter the chute formed by the guide rods 13. As the first edge 44a of the escapement 44 is lowered, the second edge 44b of the escapement 44 raises to prevent the passage of any succeeding container 11. In order to prevent unwanted passage of a container 11 while the escapement 44 is in the second position, the clearance between the second edge 44b of the escapement 44 and one or more guide rods 39 is small enough to preclude passage of a container. When the pressure in signal line 52 is released and pressure is again applied to signal line 51, the escapement 44 is returned to its first position and the container 11 which has previously been impeded by the second edge 44b of the escapement 44 will roll into contact with the first edge 44a of the excapement 44.

Although the operation of the escapement mechanism is illustrated utilizing hydraulic or pneumatic actuating means, an electrically operated solenoid, a direct mechanical linkage, or any other similar mechanism can be employed to operate the escapement. The use of the described escapement mechanism permits precise control of the time at which each container 11 enters the chute formed by guide rods 13 and enables the escapement mechanism to be synchronized with the dispensing mechanism 12, thereby advantageously improving the efficiency and accuracy of the dispensing mechanism operation.

The dispensing mechanism 12, as illustrated in FIG. 1, comprises a plurality of worm gears 61 each driven by a worm drive gear 62. The worm drive gears 62 are all driven by a single ring gear 63. The worm gears 62 are positioned in a circular array which is coaxial with the chute formed by the guide rods 13 and with the containers 11 within the chute. The cylindrical axis of each worm gear 61 is parallel to the elongated, generally vertical, axis of the containers resting above the dispensing mechanism 12.

Figure 5:
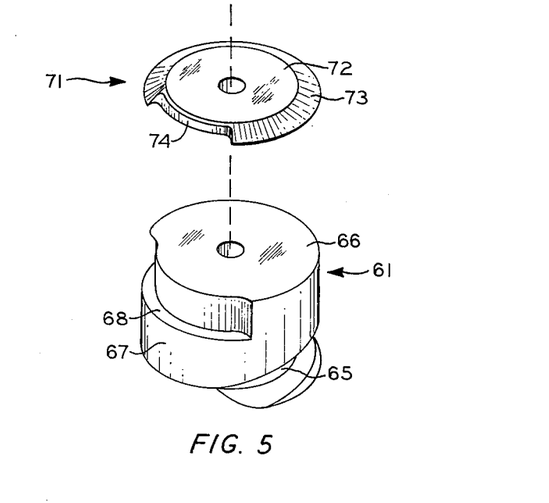

As illustrated in the exploded pictorial view of FIG. 5, each worm gear 61 is in the form of a cylinder having a groove 65 in the cylindrical surface 67 extending in a generally helical path from the top 66 of the worm gear 61 to the bottom thereof. The vertical height between the opposite side walls of the groove 65 is greater than the vertical height of the rim 10 of each container 11. The groove 65 can be enlarged at the upper end thereof to provide a shoulder portion 68 which is at least generally perpendicular to the axis of the cylindrical surface 67. Each of the worm gears 61 is positioned within the dispensing mechanism 12 to simultaneously receive in the groove 65 thereof the rim 10 of the lowermost container 11 in the chute formed by the guide rods 13 by permitting the rim 10 of the container 11 to drop onto the shoulder 68 of the worm gear 61. As all the worm gears 61 are simultaneously rotated by their associated drive gears 62 and the ring gear 63, the rim 10 of the container 11 is guided downward through the groove 65 of each worm gear 61 until the container is released into the opening 19 of the conveyor plate 17 which has been indexed by the conveyor 14 to a position below the dispensing mechanism 12.

In order to insure the proper alignment of the bottom of each container 11 as it enters the dispensing mechanism 12, when the invention is used to feed non-nestable containers, each worm gear 61 can be equipped with a worm lead-in 71. The worm lead-in 71 is of a generally regular frusto-conical shape having a bottom surface adapted to mate with the top surface 66 of its associated worm gear 61. Each worm lead-in 71 has a generally flattened top 72 and a sloping side surface 73 adapted to guide the bottom of a container coming in contact therewith toward the perimeter of the worm lead-in 71 and, in conjunction with the worm lead-ins 71 positioned above the other worm gears 61, to guide the container into the dispensing mechanism and avoid interruption of the flow of containers into the dispensing mechanism 12 which might be caused by the bottom of a container 11 becoming lodged against the flat top surface 66 of a worm gear 61. A cutout portion 74 in the worm lead-in 71 is matched to the portion of the top surface 66 of the worm gear 61 which defines the beginning of the groove 65. The angle formed by the inclined surface 73 of the worm lead-in 71 with an axis perpendicular to the top and bottom surfaces of the worm lead-in is preferably within the range of from about 20° to about 40°, more preferably about 30°. This angle is illustrated as angle A in FIG. 6. The worm lead-ins 71, positioned atop the worm gears 61, in conjunction with the guide rods 13 and guide shoes 77 (see FIG. 1) located between adjacent guide rods 13, combine to assure proper alignment of containers 11 entering the dispensing mechanism 12.

Figure 6:
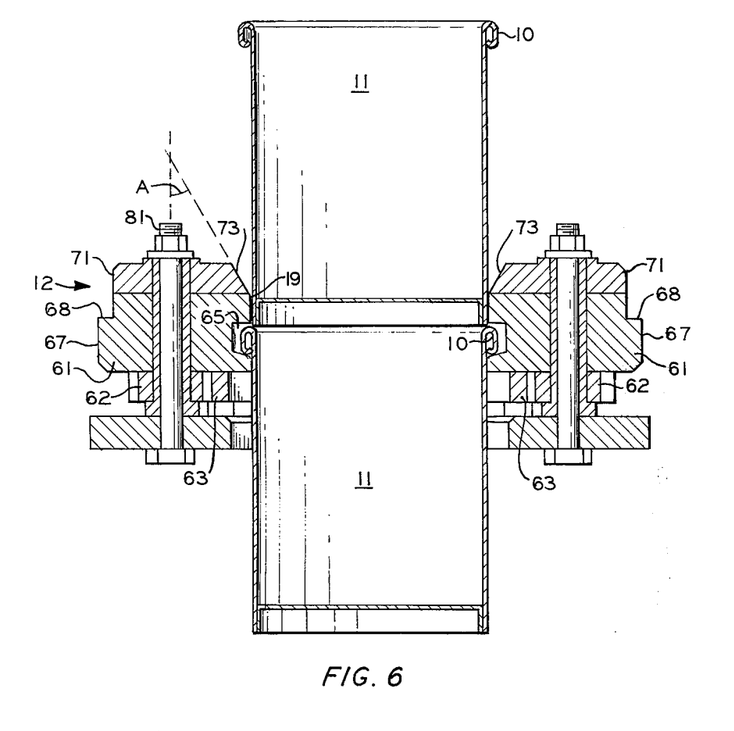
FIG. 6 is a vertical sectional view of the container-dispensing mechanism.

The operation of the dispensing mechanism 12 is further illustrated by FIG. 6 which is a sectional elevation view cut through the center of two worm gears 61 located on opposite sides of the dispensing mechanism 12. Ring gear 63 is shown engaging worm drive gears 62 which in turn rotate their respective worm gears 61 and worm lead-ins 71 about fixed shafts 81. In FIG. 6 the rim of a container 11 has been engaged by the respective grooves 65 of the worm gears 61 and as the worm gears are rotated by the movement of ring gear 63, the bottom container 11 is being lowered toward an opening 19 (not shown) associated with the conveyor 14. When the worm gears have been additionally rotated approximately one-half revolution from the position illustrated, the rim 10 of the bottom container 11 will have reached the end of the groove 65 in each worm gear 61. In this position the bottom container 11 will be precisely positioned with relation to the opening 19 and the container 11 will be allowed to fall freely into the opening 19. When the bottom container 11 is released, the container above it which has previously been resting against the rim of the bottom container will fall into the dispensing mechanism 12, the rim 10 will be engaged against surface 68 of the respective worm gears 61 and the second container, in turn, will be dropped into a succeeding opening 19. The bottom of the container 11 is preferably started into the opening 19 a short distance, from about 1/32 to about 5/32 inches for example, preferably about 3/32 inches, prior to the release of the container by the dispensing mechanism 12.

The invention is particularly well adapted for use with non-nestable containers, and non-nestable containers having relatively small rims. When using a non-nestable container in the filling machine described, the size of the openings 19 in the plate 17 of the conveyor 14 must be very close to the outside diameter of the containers 11. Because the openings 19 and the containers 11 are so nearly the same size and all containers cannot be expected to be perfectly round, the accurate and reliable positioning of each successive container by the dispensing mechanism 12 is extremely important. As can be readily seen from the drawing, particularly FIGS. 1 and 6, each container 11 which is released from the dispensing mechanism 12 will, at the time of its release, be bearing the weight of the containers positioned above it within the chute defined by guide rod 13. The moderate amount of force applied by a limited number of containers located in a stable position above the bottom container and resting upon the rim 10 of the bottom container is useful in inserting the container into its designated opening 19 surely and rapidly and in helping to guide the succeeding container into the dispensing mechanism 12. Too much weight bearing on a container entering the dispensing mechanism, however, can cause the rim 10 of the container to be distorted or damaged, can cause the dispensing mechanism to jam, or can even cause the container to be forced through the dispensing mechanism out of sequence when its rim 10 is no longer able to support the weight above it. Impact of an additional container on the stack above the dispensing mechanism occurring at the same time that a container rim is engaged by the dispensing mechanism can also cause damage to the rim 10. Likewise, a sudden increase in weight occurring at the precise moment that a container is released by the dispensing mechanism to drop into an opening 19 can cause a sudden alteration of the positioning of the container which had been accomplished by the worm gears 61, causing the container 11 to miss the opening 19 or to be improperly inserted into the opening 19.

In order to utilize the containers within the chute defined by guide rods 13 and annular rings 31 to provide a desirable force on the container being handled by the dispensing mechanism 12, a predetermined number of unfilled containers 11 are maintained within the guide rods 13 and above the dispensing mechanism 12. Each time the dispensing mechanism 12 releases a container 11 onto the conveyor 14, the escapement mechanism 44 is actuated and another container 11 is released from the transfer station of the conveyor 33 into the chute defined by the guide rods 13. In order to avoid undesirable effects caused by the impact of the additional container 11 at the top of the stack of containers within the guide rods 13, the actions of the dispensing mechanism 12 and the escapement mechanism 44 are synchronized to insure that the impact of the additional container will occur at a time other than the time at which the dispensing mechanism 12 is releasing a container 11 into an opening 19 of the conveyor 14 or engaging the next container to be released. The synchronization between the dispensing element 12 and the escapement mechanism 44 can be accomplished by direct mechanical linkage between the ring gear 63 of the dispensing mechanism and the escapement mechanism 44, can be the generation of an electric, hydraulic, or pneumatic signal delivered to the actuating means associated with the escapement mechanism 44 in response to a predetermined position of the worm gears within the dispensing means 12, or can be any other similar means. In the preferred embodiment schematically illustrated in FIG. 7, a cam operated valve 81 linked mechanically to the ring gear 63 provides a pneumatic signal to the double acting cylinder 47 immediately following the release of a container by the dispensing mechanism 12 so that an additional container 11 will be released by the escapement mechanism 44 and fall into position within the chute defined by guide rods 13 prior to the release of another container by the dispensing mechanism 12.

Figure 7:
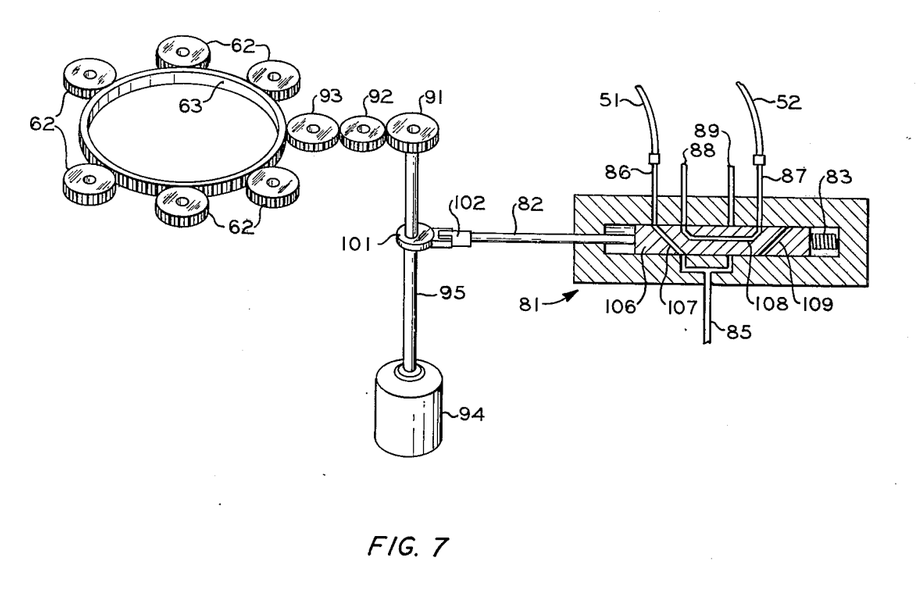
FIG. 7 is a schematic representation of the synchronized signal generating means of the invention.

Referring now to FIG. 7 in detail, a preferred embodiment of the synchronizing mechanism of the invention is schematically illustrated. The worm drive gears 62, to which the worm gears 61 are attached, are driven by ring gear 63 which is in turn driven by a main drive gear 91 through reversing gear 92 and auxiliary drive gear 93. The main drive gear 91 is driven by a primary source of power, such as a motor 94, through a shaft 95. A cam 101 is mechanically linked to the worm drive gears 62. In the embodiment illustrated the cam 101 is attached to the drive shaft 95. When the mechanical linkage between the cam 101 and the worm drive gear 62 is accomplished in this manner, the main drive gear 91 must be of the same effective size as the worm drive gear 62 so that one revolution of each worm drive gear 62 corresponds to one revolution of the drive shaft 95 and cam 101. A cam follower 102 is connected to a switch operating linkage 81 associated with the cam operated switch 81. The cam operated switch 81 is shown schematically in cross section in order to illustrate its switching action. A spring 83 or other suitable means associated with the cam operated valve 81, mechanical linkage 82, or cam follower 102 maintains the cam follower 102 in contct with the cam 101. The cam operated valve 81 is equipped with an inlet port 85, outlet ports 86 and 87, and exhaust ports 88 and 89. The inlet port 85 is connected to a suitable source of pneumatic power. The internal valve mechanism 106 is equipped with switching ducts 107, 108 and 109.

When the internal valve mechanism 106 is forced into the first position illustrated, compressing the spring 83, the inlet port 85 is connected through the switching duct 107 to the outlet port 86 which is in turn connected to signal line 51. In this first position the signal line 52 is connected through switching duct 108 to the exhaust port 88. In this first position the signal present through signal line 51 causes the escapement mechanism 44 to be placed into its first position illustrated by FIG. 4. When movement of the cam 101 permits the internal valve mechanism 106 to be forced by the compressed spring 83 into its second position (not illustrated), the inlet port 85 will be connected through internal switching duct 109 to the outlet port 87 which is in turn connected to signal line 52, and signal line 51 will be vented through outlet port 86, internal passage 108, and vent port 89. In this second position, with a signal applied through signal line 52 and with signal line 51 being vented, the escapement mechanism 44 will be placed in its second position as illustrated by FIG. 4A.

If, during the use of a particular size or weight of container 11, it is desirable to increase or decrease the number of containers stacked in position above the dispensing mechanism, adjustment of the synchronization between the dispensing mechanism and the escapement mechanism may be necessary to insure that the containers released by the escapement mechanism do not interfere with the reliable and efficient operation of the dispensing mechanism.

The method and apparatus described have been used successfully to feed coated paperboard containers into conveyor openings 19 having a total diameter of only 0.1 inch greater than the diameter of a perfectly round container 11 at the rate of 40 containers per minute, with a dwell time of approximately 0.9 seconds during which each container must be completely inserted into its respective conveyor opening, at an efficiency of nearly 100 percent.

Although the invention has been described herein in conjunction with a preferred embodiment feeding non-nestable containers to a container-filling machine, it should be understood that the method and apparatus can be readily adapted for use in conjunction with nestable containers and for use with other specific machines, conveyors, or control systems. These and other reasonable variations and modifications are possible within the scope of the foregoing disclosure and the appended claims to the invention.

I claim:
1. Apparatus for feeding unfilled containers comprising:
   first conveyor means for providing a supply of containers having uniformly oriented open tops to a transfer station;

container release means located at said transfer station for permitting a container to pass said transfer station in response to receipt of a container advance signal by an actuation means operably connected to said container release means;

second conveyor means for accepting a container which has passed said transfer station and delivering said container to a container dispensing station;

container dispensing means located at said container dispensing station for orienting each container arriving at said container dispensing station and releasing each container; and signal generating means for delivering said container advance signal to said container release actuation means in timed relationship with the operation of said container dispensing means.

2. Apparatus in accordance with claim 1 additionally comprising a third conveyor means for accepting each container released by said container dispensing means.

3. Apparatus in accordance with claim 2 wherein said container release means comprises an escapement means.

4. Apparatus in accordance with claim 2 wherein said container dispensing means comprises a plurality of worm gear means adapted to engage an annular rim of each container arriving at said container dispensing station and to release the thus engaged container into an opening of said third conveyor means when said third conveyor means is in a preselected position and wherein said signal generating means comprises means for delivering said container advance signal to said container release actuation means in synchronization with the rotation of said worm gear means to generate said container advance signal when said worm gear means are in a preselected position.

5. Apparatus in accordance with claim 4 wherein said second conveyor means comprises a gravity operated conduit extending substantially vertically from said container dispensing means for a distance at least equal to combined height of a preselected number of said unfilled containers and wherein said container release means, said actuation means, said signal generating means, and said second conveyor means are adapted to maintain said preselected number of said unfilled containers resting upon the container in contact with said container dispensing means at said container dispensing station.

6. Apparatus in accordance with claim 5 wherein said container release means comprises an escapement means.

7. Apparatus in accordance with claim 1 wherein said second conveyor means comprises a gravity operated conduit extending substantially vertically from said container dispensing means for a distance at least equal to the combined height of a preselected number of said unfilled containers and wherein said container release means, said actuation means, said switch means, and said second conveyor means are adapted to maintain said preselected number of said unfilled containers resting upon a container located at said container dispensing station.

8. Apparatus in accordance with claim 1 wherein said container dispensing means comprises a plurality of worm gear means adapted to engage an annular rim of each container arriving at said container dispensing station and to release the thus engaged container and wherein said signal generating means comprises means for delivering said container advance signal to said container release actuation means in synchronization with the rotation of said worm gear means to generate said container advance signal when said worm gear means are in a preselected position.

9. A method of feeding unfilled containers comprising:

providing unfilled containers having uniformly oriented open tops to a transfer station;

releasing one container from said transfer station each time an actuation signal is generated;

conveying the containers released from said transfer station to a dispensing station;

releasing one container at a time from said dispensing station; and generating an actuation signal in conjunction with the release of each container from said dispensing station.

10. A method in accordance with claim 9 additionally comprising timing the generation of said actuation signal to prevent disturbance with the release of a container from said dispensing station by the release of a container from said transfer station.

11. A method in accordance with claim 10 additionally comprising maintaining a preselected number of said unfilled containers being conveyed from said transfer station to said dispensing station in contact with and resting upon the unfilled container at said dispensing station during the release of the container from said dispensing station.

12. A method in accordance with claim 9 additionally comprising maintaining a preselected number of said unfilled containers being conveyed from said transfer station to said dispensing station in contact with and resting upon the said unfilled container at said dispensing station during the release of the container from said dispensing station.

13. A method in accordance with claim 9 wherein said unfilled containers comprise non-nestable, substantially cylindrical containers each having an annular rim around the top thereof and wherein said step of depositing one container at a time from said dispensing station comprises:

engaging the annular rim of a container arriving at said dispensing station with a plurality of worm gear means;

rotating said worm gear means to release the thus contacted container into said conveyor; and receiving the annular rim of the succeeding container by said plurality of worm gear means.

14. A method in accordance with claim 13 additionally comprising timing the generation of said actuation signal to prevent disturbance with the release of a container from said dispensing station by the release of a container from said transfer station.

15. A method in accordance with claim 9 wherein said unfilled containers comprise non-nestable, substantially cylindrical containers each having an annular rim around the top thereof and wherein said step of depositing one container at a time from said dispensing station comprises:

engaging the annular rim of a container arriving at said dispensing station with a plurality of worm gear means;

rotating said worm gear means to release the thus contacted container onto said conveyor;

receiving the annular rim of the succeeding container by said plurality of worm gear means; and wherein generating said actuation signal comprises operating a switch in synchronization with the rotation of said worm gear means to generate said actuation signal when said worm gear means are in a preselected position.

16. A method in accordance with claim 15 additionally comprising maintaining a preselected number of said unfilled containers being conveyed from said transfer station to said dispensing station in contact with and resting upon the said unfilled container at said dispensing station during the release of the container from said dispensing station.

17. A method in accordance with claim 15 additionally comprising timing the generation of said actuation signal to prevent disturbance with the release of a container from said dispensing station by the release of a container from said transfer container.

18. A method of feeding unfilled containers, said method comprising:

providing unfilled, non-nestable, substantially cylindrical containers, each having an annular rim around the top thereof, to a transfer station;

releasing one container from said transfer station each time an actuation signal is generated;

conveying containers released from said transfer station to a dispensing station;

engaging the annular rim of a container arriving at said dispensing station with a plurality of worm gear means;

rotating said worm gear means to release the thus engaged container onto a conveyor;

receiving the annular rim of the succeeding container by said plurality of worm gear means;

maintaining a preselected number of said unfilled containers being conveyed from said transfer station to said dispensing station in contact with and resting upon the unfilled container at said dispensing station during the release of the container onto said conveyor; and operating a switch in synchronization with the rotation of said worm gear means to generate said actuation signal when said worm gear means are in a preselected position, said preselected position being timed to prevent disturbance with the release of a container from said dispensing station by the release of a container from said transfer station.

* * * * *

UNITED STATES PATENT AND TRADEMARK OFFICE
CERTIFICATE OF CORRECTION

PATENT NO. : 3,940,014
DATED : February 24, 1976
INVENTOR(S) : Alfred W. Kinney

It is certified that error appears in the above-identified patent and that said Letters Patent are hereby corrected as shown below:

Column 10, line 47, claim 13, after "container" the word "into" should be --- onto ---.

Signed and Sealed this

Twelfth Day of April 1977

[SEAL]

Attest:

RUTH C. MASON
Attesting Officer

C. MARSHALL DANN
Commissioner of Patents and Trademarks